United States Patent [19]

Takahashi

[11] Patent Number: 4,829,510
[45] Date of Patent: May 9, 1989

[54] DISK FOR RECORDING AND/OR REPRODUCING APPARATUS HAVING MAGNETIC CHUCKING DEVICE

[75] Inventor: Kenji Takahashi, Miyagi, Japan
[73] Assignee: Sony Corporation, Tokyo, Japan
[21] Appl. No.: 151,578
[22] Filed: Feb. 2, 1988

[30] Foreign Application Priority Data

Feb. 6, 1987 [JP] Japan ................................ 62-25939
Jun. 3, 1987 [JP] Japan .......................... 62-086447[U]
Jul. 27, 1987 [JP] Japan .......................... 62-114682[U]

[51] Int. Cl.⁴ ...................... G11B 17/02; G11B 19/20
[52] U.S. Cl. ..................................... 369/290; 369/271
[58] Field of Search ............... 369/289, 290, 291, 292, 369/270, 271

[56] References Cited

FOREIGN PATENT DOCUMENTS 0158360 4/1985 European Pat. Off. .
0186195 12/1985 European Pat. Off. .
0192188 2/1986 European Pat. Off. .
0230963 1/1987 European Pat. Off. .
739857 11/1955 United Kingdom ................ 369/290

*Primary Examiner*—Steven L. Stephan
*Attorney, Agent, or Firm*—Lewis H. Eslinger; Donald S. Dowden

[57] ABSTRACT

An optical disk is disclosed in which a disk hub is constituted by a disk-like metal plate having a plurality of engaging projections formed on its outer periphery by the stepping operation and a ring-like member of synthetic resin having a central hole engaged by a spindle shaft of a disk drive unti and mating engaging portions engaging with engaging projections of a metal plate. The metal plate is mounted to the ring-like member by turning the metal plate in a predetermined mounting direction with respect to the ring-like member to cause the engaging projections of the metal plate to be engaged with the mating engaging portions of the ring-like member.

21 Claims, 15 Drawing Sheets

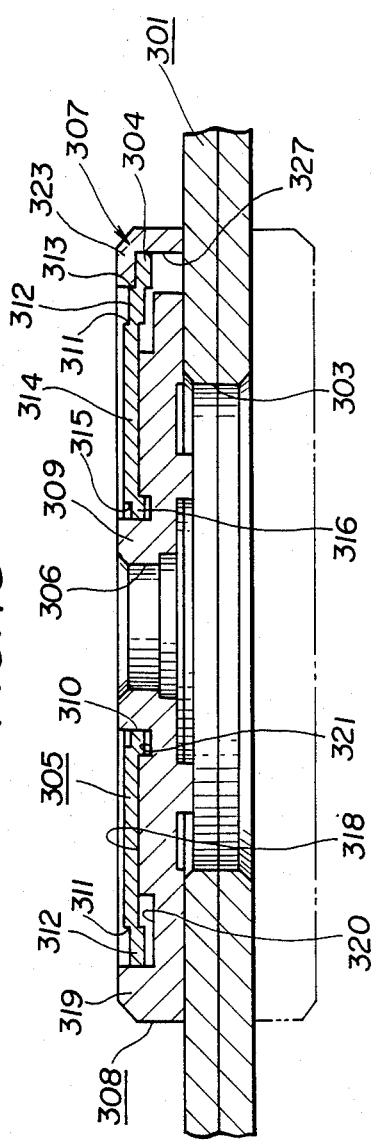

DISK FOR RECORDING AND/OR REPRODUCING APPARATUS HAVING MAGNETIC CHUCKING DEVICE

BACKGROUND OF THE INVENTION

1. Field of the Invention

This invention relates to a disk, such as an optical disk, that is applied to a magnet clamp type recording and/or reproducing apparatus and, more particularly, to a disk having a-disk hub at the center thereof adapted to be attracted to and supported by a magnet of a disk drive device.

2. Description of the Prior Art

Up to now, there is known a disk recording and/or reproducing device in which a disk such as an optical disk is employed as the recording medium for information signals.

In the recording and/or reproducing apparatus in which the disk is used as the recording medium, the disk is revolved at an elevated speed of several hundreds to one thousand and several hundreds r.p.m. while a laser beam is irradiated on the recording surface of the disk for recording and/or reproduction. In order to assure a high speed rotation of the disk, clamp means are provided whereby the disk can be integrally connected to the disk drive unit and revolved at an elevated speed. As means for clamping the disk to the disk drive unit, so-called magnet clamp type clamp means has been proposed in which a magnet is provided to the disk drive unit and a disk hub having a magnetic metal plate is provided at the center of the disk. The metal plate is magnetically attracted by the magnet so that the disk is integrally retained by the disk drive device.

It is noted that, in the case of the disk applied to the magnet clamp type disk drive device, it is necessary that a clamping metal plate be attached to a disk hub mounted to the center of the disk as described above. Therefore, the disk is constituted by a supporting member secured to the disk substrate and a clamping magnetic metal plate.

However, since the supporting member must be secured to the disk substrate, it is formed of synthetic material different in material quality from the metal plate. Hence, the supporting member and the metal plate have different heat contraction coefficients. Therefore, when the metal plate is integrally mounted to the supporting member by metal mold casting, such as outsert or insert casting, and when the disk hub is secured as by ultrasonic welding to the center of the disk substrate of the disk, excess stress may be produced in the disk substrate at the time of welding or temperature rise in the disk substrate due to the aforementioned differential heat contraction between the supporting member and the metal plate, thus occasionally resulting in distortion of the disk substrate surface. Such excess stress on the disk substrate or distortion in the disk substrate surface tends to cause double refraction of the laser beam incident on and reflected from the disk substrate at the time of disk recording and/or reproduction, thus occasionally causing reading and writing errors of information signals.

In order to prevent unnecessary or excess stress of the disk substrate and distortion of the disk surface and the resulting double refraction of the laser beam as described above, it is also known to construct the disk hub of two separate members, that is, a supporting member and a metal plate, and to have the metal plate mountable to the supporting member.

FIG. 1 shows a disk applied to this magnet clamp type disk drive device.

In the optical disk shown in FIG. 1, a disk hub 52 for attachment to the disk drive device is mounted to the center of a disk substrate 51 having a central opening 50. The disk hub 52 is comprised of a ring-like member 55 secured to the center of the disk substrate 51 and having a spindle hole 54 engaged by a center spindle 53 of the disk drive unit adapted for rotationally driving the disk, and a clamping metallic plate 56 mounted on the ring-like member 55. Retaining pieces 57 are provided to the metal plate 56. These retaining pieces 57 are formed by cutting a portion of the surface of the metal plate 56 facing the magnet of the disk drive in the form of a letter U by punching, and bending the inner piece towards the lower surface. In the metal plate housing section 58, retaining apertures 59 for engaging and retaining the pieces 57 are formed at positions in register with the retaining pieces 57.

In this manner, by introducing the retaining pieces 57 into the registering retaining apertures 59 in the ring-like member 55 and turning the metal plate 56 in the retaining direction, the metal plate 56 can be integrally engaged with and retained by the ring-like member 55.

The above described optical disk is mounted to the disk table 60, as shown in FIG. 2, with the center spindle 53 engaged in the spindle hole 54 of the ring-like supporting member 55 of the disk hub 52. On the disk table 60 and at positions registering with the metal plate 56 in the disk hub 51, a magnet 61 is positioned with a small gap g from the metal plate. The metal plate 56 mounted on the disk hub 51 is attracted magnetically so that the optical disk may be revolved in unison with the rotation of the center spindle 53 of the disk drive unit. It is noted that the small gap g is provided between the metal plate 56 and the magnet 61 because it would be difficult to take out the disk from the disk table 60 if the metal plate 56 was completely attracted by the magnet 61.

It is noted that, when attaching the optical disk to the disk drive unit, the non-record portion on the inner peripheral side of the disk substrate 51 abuts on a reference mounting surface 62 of the disk table 60 in order to determine the mounting position of the optical disk.

It is noted that, when driving the disk into rotation by the disk drive unit, the speed and the amount of rotation of the disk cannot be controlled unless the rotation of the center spindle and the optical disk in unison with each other is assured. For this reason, the disk need be sufficiently magnetically attracted by the magnet so as to be made fast with it, in order that the optical disk will not slip on the disk table. However, an excessively strong magnetic attraction may result in the optical disk being unable to be detached easily from the disk table. Occasionally, the disk hub may be disengaged from the disk substrate due to the force of attraction of the magnet such that only the disk substrate is detached.

Therefore, the force of magnetic attraction of the magnet should be such as to prevent the disk slip and to enable the disk to be detached easily from the disk table. It is therefore necessary to select the force of magnetic attraction of the magnet and to maintain sufficient positional accuracy of the metal plate in the disk hub with respect to the magnet so that the aforementioned gap may always have a predetermined constant value.

However, when the retaining pieces are provided to the metal plate by punching or bending and these retaining pieces are engaged in the retaining holes of the disk hub for securing the metal plate in the disk hub, the retaining pieces are formed by bending a part of the metal plate, so that fluctuations are caused in the bend angle due to socalled springback and accuracy in the bend of the retaining portions. Hence it becomes difficult to maintain the height of the metal plate with respect to the disk substrate forming the mounting reference plane within the allowable dimensional tolerance so that the accuracy in the position of the metal plate cannot be assured sufficiently. In addition, due to the fluctuations in the bend angle of the retaining pieces of the metal plate, the metal plate cannot be mounted parallel to the disk substrate, resulting in the fluctuations in the extent of the gap g. Also, as a result of repetition of the mounting and dismounting of the disk to and from the disk drive device, the metal plate may be detached under the force of attraction by the magnet, or the disk hub may be peeled from the disk substrate under the load or unusual force due to the oblique mounting position of the metal plate.

In addition, the retaining pieces of the metal plate are formed by punching a portion of the surface of the metal plate that faces the magnet, these retaining pieces being retained by the retaining apertures in the disk hub, so that the metal plate and the magnet cannot be confronted to each other resulting in the lowered force of magnetic attraction.

BRIEF SUMMARY OF THE INVENTION

It is therefore an object of the present invention to obviate the above deficiencies of the prior art and to provide an optical disk applied to the magnet clamp type system and provided with a disk hub so designed that the high mounting accuracy of the metal plate can be maintained while the force of magnetic attraction of the magnet is not lowered.

The present invention provides a disk comprising a metal plate including plural engaging projections formed on the edge by a stepping operation, and a ring-like member of a synthetic resin having a central hole engaged by a center spindle of a disk drive unit and mating engaging portions engaged by said engaging projections on the edge of said metal plate, said mating engaging portions each including a control part for controlling the amount of rotation of said metal plate in the mounting direction and an inhibit part for inhibiting rotation of said metal plate in the direction opposite to the mounting direction of said metal plate, said metal plate being turned in a predetermined mounting direction with respect to said ring-like member to cause the engaging projections of said metal plate with the mating engaging portions of said ring-like member for mounting said metal plate to said ring-like member secured to said disk substrate.

According to the present invention, the disk-like metal plate provided with plural engaging projections formed by stepping is turned in a predetermined mounting direction with respect to the ring-like member to cause said engaging projections of the metal plate to be engaged in the mating engaging portions of the ring-like member to cause the metal plate to be engaged with and retained by the ring-like member, thereby to improve the accuracy in the mounting position and in the mounting strength of the metal plate in the ring-like member.

BRIEF DESCRIPTION OF THE DRAWINGS

FIG. 16 is a sectional view along line F—F of FIG. 15.

FIG. 17 is an enlarged view of a portion of FIG. 16.

DESCRIPTION OF PREFERRED EMBODIMENTS

A first embodiment of the present invention will be explained by referring to FIGS. 3 to 6.

The present invention is applied to an optical disk in which a disk hub 102 for clamping the optical disk to a disk drive device for rotationally driving the optical disk is mounted at the center of a disk substrate 101.

The disk substrate 101 is obtained by mold casting synthetic resin such as polycarbonate or glass material in the form of a disk, and is constituted by bonding two disk substrate halves, each having a record layer and a protective layer for the record layer, at the respective protective layers, so as to be used as an optical disk for double side recording and/or reproduction. A center hole 103 is formed at the center of the disk substrate 101.

Figure 1:
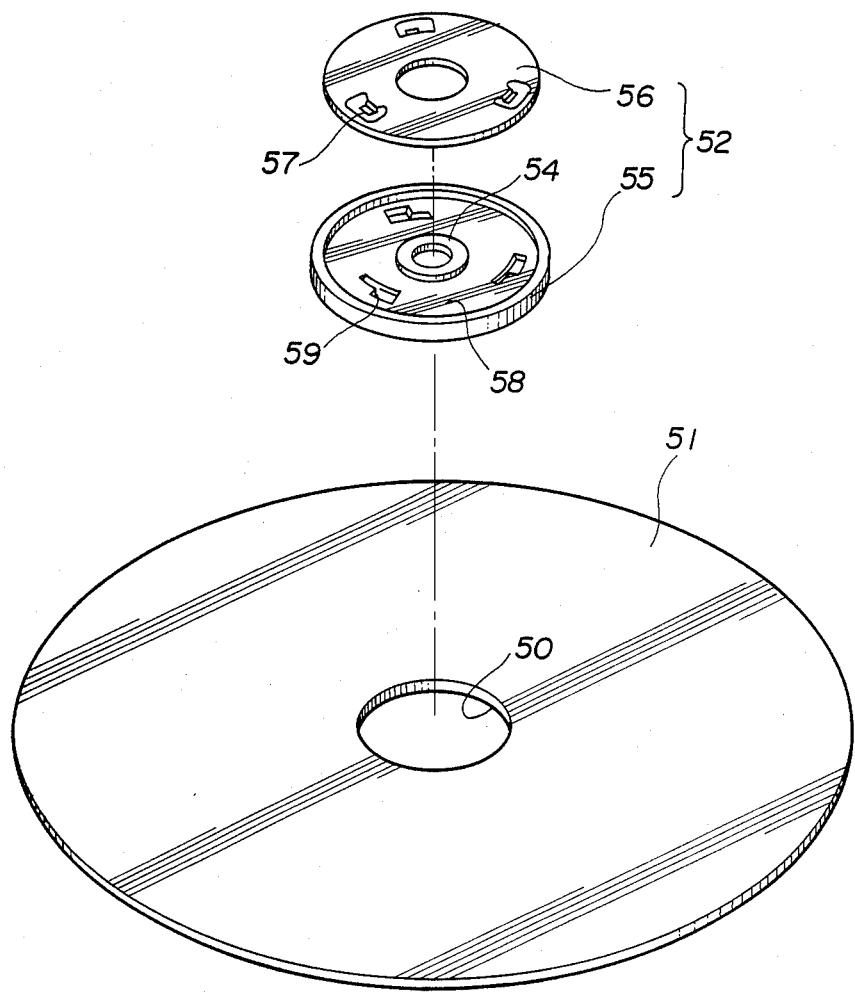
FIG. 1 is an exploded perspective view showing the conventional disk.
Figure 2:
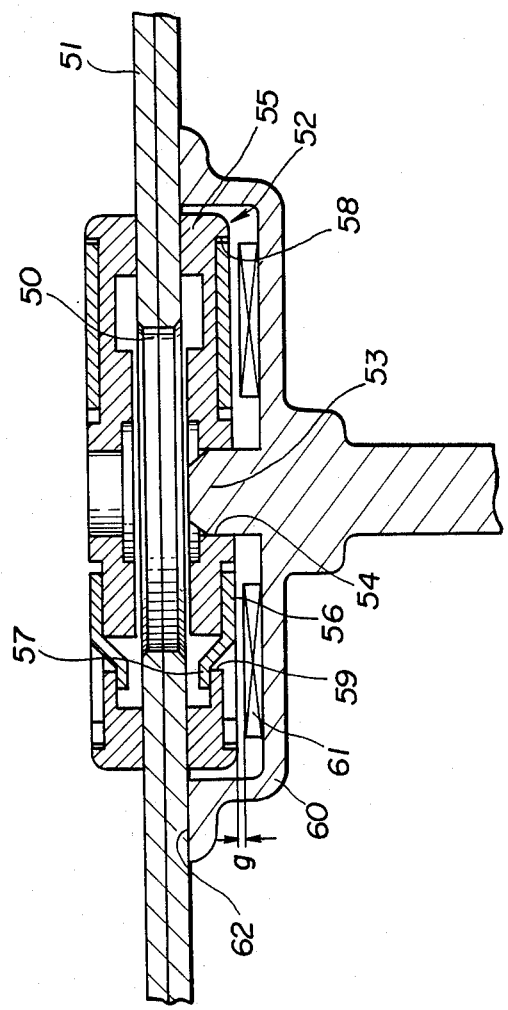
FIG. 2 is a sectional view showing the conventional disk mounted to the disk drive unit.
Figure 3:
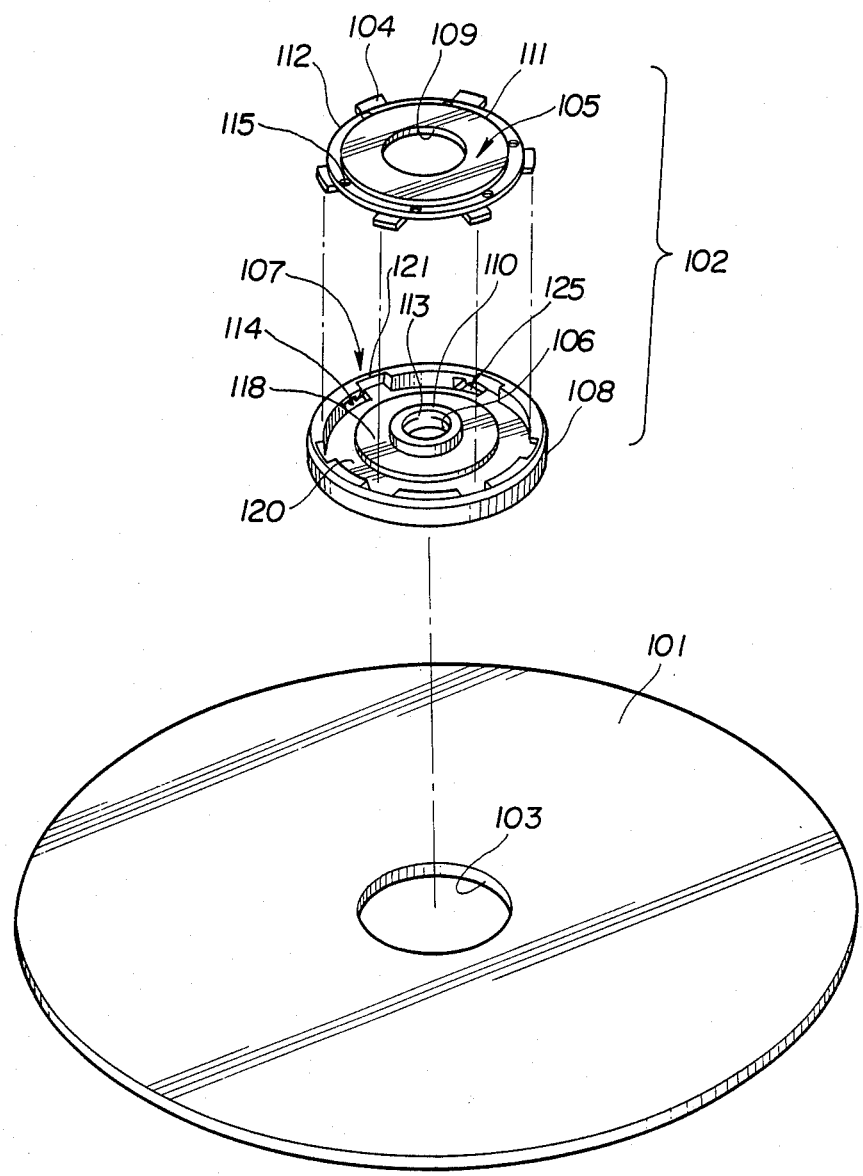
FIG. 3 is an exploded perspective view showing the disk according to a first embodiment of the present invention.
Figure 4A:
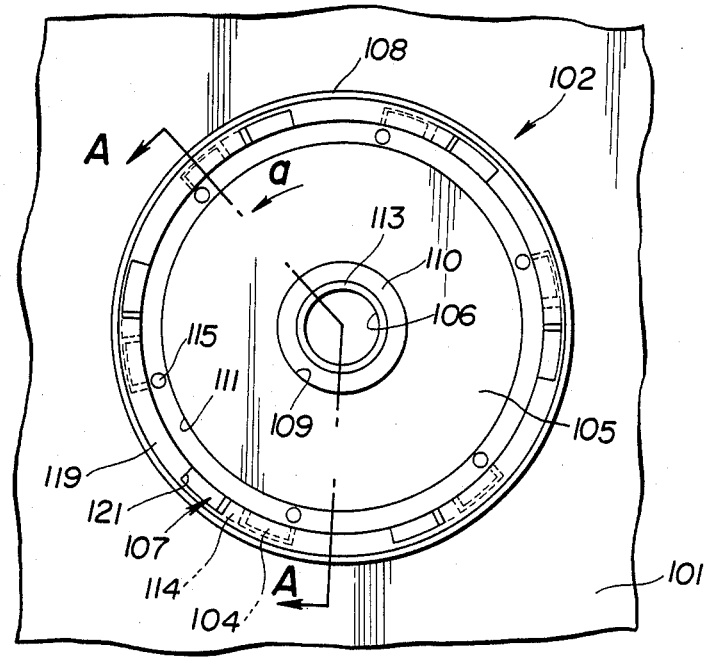
FIG. 4A is a plan view showing essential parts of a disk hub of the disk of FIG. 3 when attached to the disk.
Figure 4B:
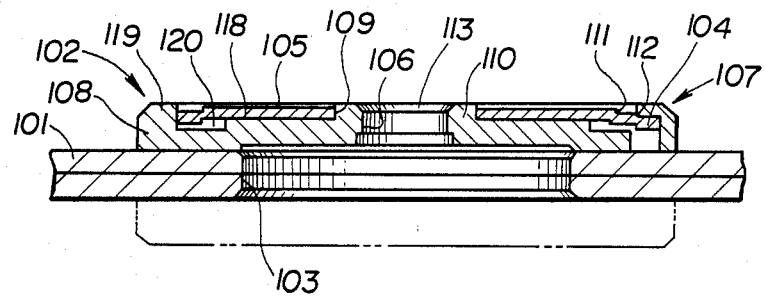
FIG. 4B is a sectional view along line A—A of FIG. 4.

As shown in FIGS. 3, 4A and 4B, the disk hub 102 is formed by a metal plate 105 that has undergone stepping along the rim and thereby provided with plural engaging projections 104 and a wing-like member 108 of synthetic resin provided with mating engaging portions 107. The member 108 has a spindle hole 106 to accommodate a center spindle secured to the disk substrate 101 and adapted for setting the disk into rotation.

Figure 6A:
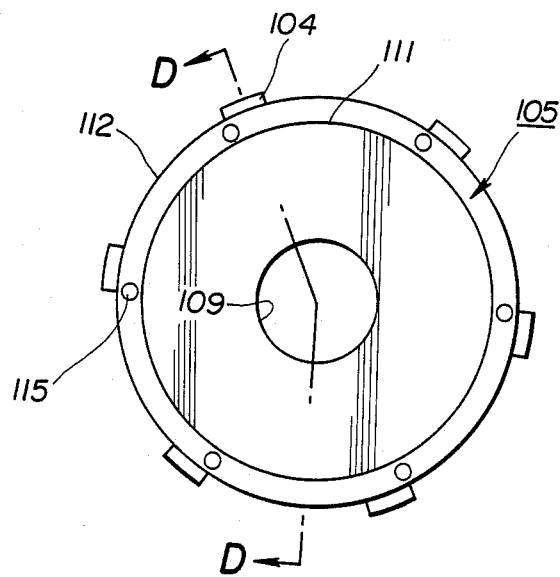
FIG. 6A is a plan view showing a metal plate according to the first embodiment of the present invention.
Figure 6B:
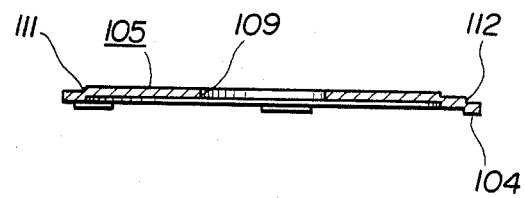
FIG. 6B is a sectional view along line D—D of FIG. 6A.

The metal plate 105 is cast in the form of a disk, as shown in FIG. 6A and has a central opening 109 having a diameter sufficient to receive a peripheral wall 110 forming the peripheral wall of the spindle hole 106 bored in the ring-like member 108. The metal plate 105 has a first step 111 formed in the semi-drawn state by the stepping operation of the metal plate 105, as shown in FIG. 6B. On the outer periphery of the first step 111, the aforementioned engaging projections 104 are provided by the intermediary of a second step 112 formed in the semi-drawn state by the stepping operation.

In this manner, the engaging projections 104 are formed with the intermediary of the first and second steps 111, 112, so that, even with the material of a reduced thickness, such as the aforementioned metal plate, it is possible to obtain a step large enough to be engaged with mating engaging portions 114 of the mating engaging portions 107, as later described, while a sufficient strength may be maintained at the connecting portions between the steps. Since no springback is caused as that occurring in the case of the bending operation, it becomes possible to adjust rigorously the dimension of the step of the engaging projection 104.

In the first step 111 of the metal plate 105, there are provided plural openings 115 engaged by positioning lugs of a jig arm, not shown, when the metal plate 105 is attached to the ring-like member 108.

When attaching the metal plate 105 to the ring-like member 108, the customary practice is that the metal plate 105 is attracted by a magnet mounted to the end of the jig arm, not shown) provided to the automatic assemblying unit for attachment of the metal plate 105 to the ring-like member 108. However, the attraction by the magnet is insufficient by itself to position the metal plate 105 such that it is difficult to correctly register the engaging projections 104 of the metal plate 105 with the mating engaging portions 107 of the ring-like member 108. Thus the openings 115 are formed in the metal plate 105 into which the jig arm is engaged for positioning the metal plate 105 and engaging the projections 104 in the mating engaging portions 107 of the ring-like member 108.

Figure 5A:
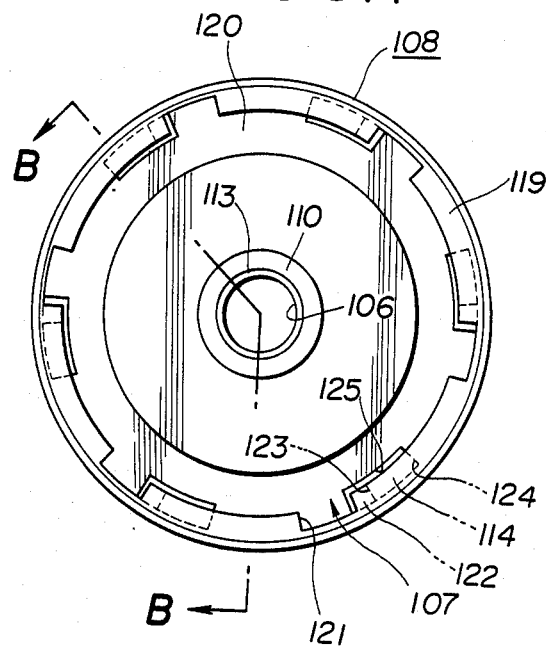
FIG. 5A is a plan view showing a ring-like member of the first embodiment of the present invention.
Figure 5B:
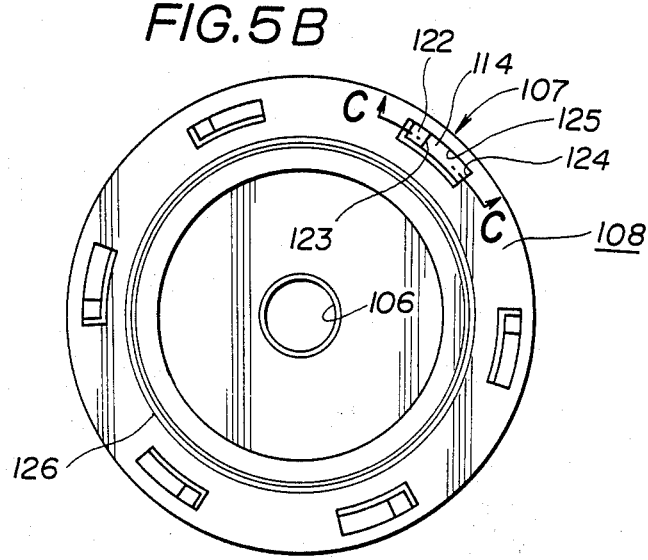
FIG. 5B is a bottom view of FIG. 5A.
Figure 5D:
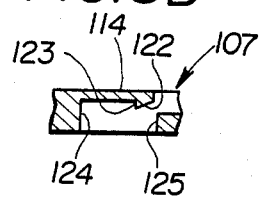
FIG. 5D is a sectional view along line C—C of FIG. 5B.
Figure 5C:
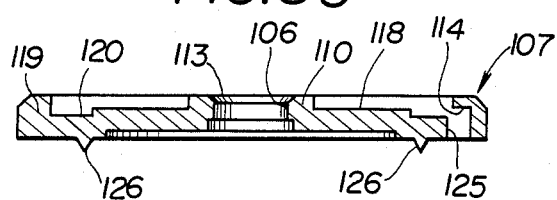
FIG. 5C is a sectional view along line B—B of FIG. 5A.

The ring-like member 108 is formed from synthetic resin in the shape of a flat cylinder and has the spindle hole 106 engaged by the center spindle of the disk drive system as shown in FIGS. 5A to 5C. This spindle hole 106 is surrounded by a peripheral wall 110 on the main surface of the ring-like member 108. An inclined surface 113 for guiding the spindle is provided on the side of the peripheral wall 110 from which the spindle is introduced.

On the outer periphery of the peripheral wall 110 on the main surface of said ring-like member 108, a metal plate housing section 118 is formed. That is, a first recess defined on the main surface of said ring-like member 108 between the outer periphery of the peripheral wall 110 and an upright wall 119 formed on the outer periphery of the ring-like member 108 serves as said metal plate housing section 118. Further, on the side of the upright wall 119 of the metal plate housing section 118 there is formed a second recess 120, which accommodates the first step 111 provided on the outer periphery of said metal plate 105.

Also on the upright wall 119, there are provided the mating engaging portions 107 at the respective positions relative to the engaging projections 104 of the metal plate 105.

The mating engaging portions 107 are formed by partially cutting the upright wall 119, as shown in FIGS. 5A to 5D, and are each comprised of an insert portion 121 and the aforementioned mating engaging portion 114 for engaging and retaining the engaging projections 104 of the metal plate 105. In these mating engaging portions 104, the mating engaging portions 114 are formed next to the insert portions 121 in the same circumferential direction. At the end part of the mating engaging portion 114 that is first engaged by the engaging projection 104 of the intruding metal plate 105, there are provided a tapered surface 122 for guiding the engaging projection 104 and an inhibit portion 123 for inhibiting the rotation in the return direction of the engaging projection 104 once engaged in the mating engaging portion 107. A control wall 124 is provided at the proximate end of engaging projection 104 for limiting the amount of rotation of the engaging projection 104 in the intruding or proceeding direction. A draft hole 125 is formed on the lower side of each of the mating engaging portions 114 for permitting withdrawal of the metal mold used for molding the mating engaging piece 114 during molding of the ring-like member 108.

Thus, after the engaging projection 104 of the metal plate 105 is inserted into the insert portion 121, the metal plate 105 may be turned in a predetermined mounting direction relative to the ring-like member 108, herein in the direction of the arrow mark a in FIG. 4A, to cause the engaging projection 104 of the metal plate 105 to be engaged in the mating engaging piece 114 formed in the mating engaging portion 107 of the ring-like member 108 for attaching the metal plate 105 in the ring-like member 108 on the disk substrate 101.

The ring-like member 108 of the disk hub 102 is mounted as by welding or adhesion to the periphery of the central opening 103 of the disk substrate 101 so that the center of the optical disk, or more correctly the center of the guide track for recording or the track formed by the information being recorded on the optical disk, will be at the center of the spindle hole 109 of the disk hub 102. When the ring-like member 108 is welded to the disk substrate 101 formed of synthetic resin as by ultrasonic welding means, fusible ribs 126 may be provided on the lower side of the member 108 for concentrating the ultrasonic waves thereto during welding. It is noted that the ring-like member 108 to which the metal plate 105 is mounted is preferably formed of the same resin material as the disk 101 in order that the double refraction caused in the disk substrate 101 due to the differential thermal expansion caused by the difference in the material quality between the ring-like member and the disk substrate 101 may be minimized.

The metal plate 105 as shown in FIG. 3 is formed as a thin disk having a flat main surface, and a number of the plates 105 may be stacked up and bonded to one another during the washing step for removing the burrs or contamination on the surface after punching, so that a sufficient washing operation may not be performed. Moreover, the operation of separating the metal plates one by one is necessary to perform, thus further hindering an efficient washing process.

Above all, when the metal plates 105 are stacked and bonded to one another during attachment thereof to the ring-like member 108, the assembly jig may grip and attempt to mount more than one metal plate 105 to the ring-like member 108.

The second embodiment of the metal plate 105 of the present invention in which the metal plates 105 when stacked are not bonded to one another and may be gripped positively by the jig one by one for attachment to the ring-like member 108, will be explained by referring to FIGS. 7 to 13.

Figure 7:
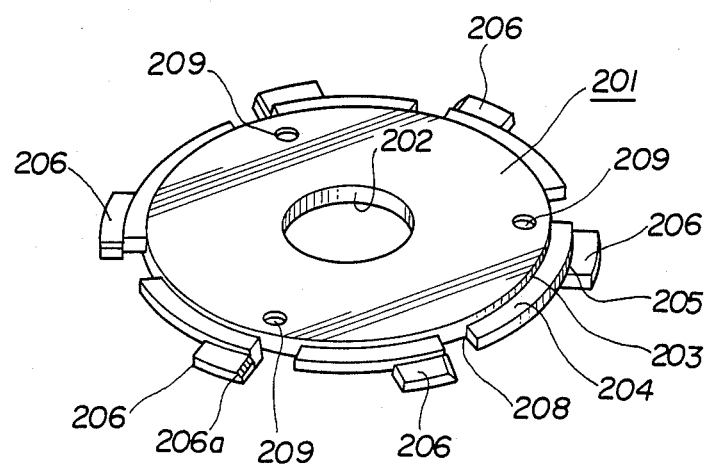
FIG. 7 is a perspective view showing a metal plate employed in a disk according to a second embodiment of the present invention.
Figure 8:
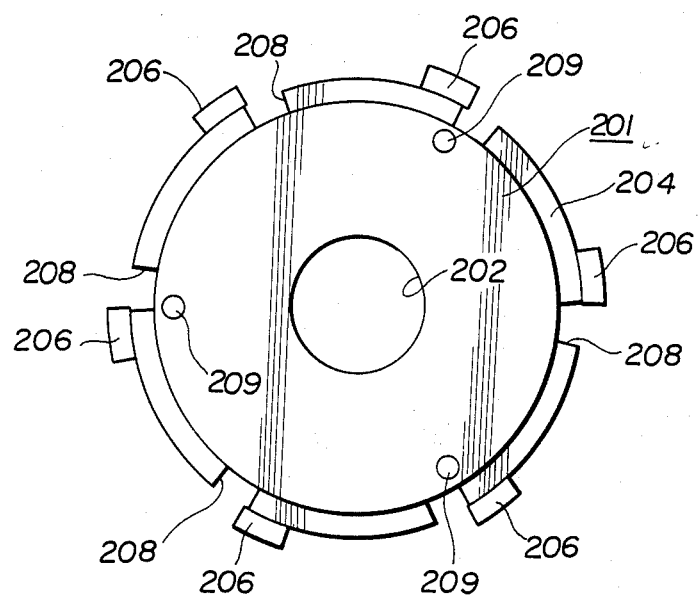
FIG. 8 is a reverse view of the metal plate shown in FIG. 7.
Figure 9:
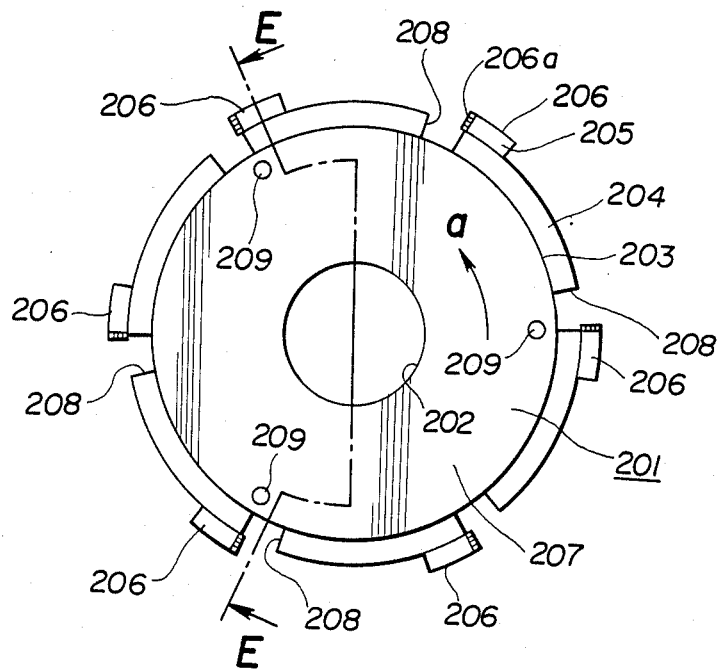
FIG. 9 is a plan view of the metal plate shown in FIG. 7.
Figure 10:
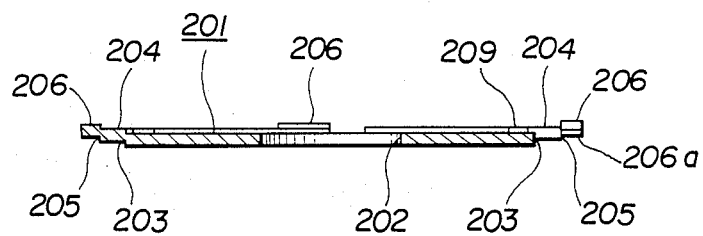
FIG. 10 is a sectional view along line E—E of FIG. 9.

The metal plate 201 according to the second embodiment is obtained by punching the thin magnetic metal plate into a disk, and has a central opening 202 engaged by a toroidal projection of the ring-like member making up a hub, as shown in FIGS. 7, 8 and 9. The toroidal projection is formed at the center of the ring-like member and provided with a spindle hole. On the outer periphery of the metal plate 201, a toroidal connecting piece 204 is formed with the intermediary of a first step 203 formed in the half drawn state, as shown in FIG. 10, by the stepping operation, while a plurality of engaging projections are formed radially at equal angular intervals and through the intermediary of second steps 205 formed in the half drawn state, similarly by the stepping operation.

In this manner, the engaging projections 206 are formed through the intermediary of the first and second steps 203, 205, so that, even when the metal plate 201 is formed from a thin metal plate, a larger step difference may be provided with respect to the main surface section 207 having the central opening 202. Thus the engaging projections 206 may be projectingly formed so as to engage with the mating engaging portions formed by removing the main surface of the ring-like member, with the main surface of the ring-like member resting on the main surface section 207, while a sufficient strength may be maintained in the toroidal connecting portion 204 between the steps 203, 205. Also, since no springback is caused as that occurring in the case of the bending operation, it becomes possible to rigorously adjust the dimension of the step of the engaging projections 206.

In the toroidal connecting piece 204 of the metal plate 201, plural jig engaging openings or recesses 208 are formed in register with the engaging projections 206. In these recesses 208, there is engaged a jig, not shown, provided to a metal plate mounting device and adapted to grip and rotate the metal plate 201 during attachment of the metal plate 201 to the ring-like member. These recesses 208 are formed in the forward rotational direction during attachment of the metal plate 201 to the ring-like member, as shown by the arrow mark a in FIG. 9 with one lateral side of each recess being substantially contiguous to one lateral side of the adjacent engaging projection 206.

On the lateral side of the engaging projection 206 facing to the recess 208, there is formed a chamfered portion 206a acting as an engaging guide when the engaging projection is engaged with the mating recess of the ring-like member.

At least the surface of the main surface section 207 of the metal plate 201 having the central hole 202 that confronts the disk table of the disk drive unit is machined to a high degree of flatness, in order that, when the optical disk fitted with the hub and the metal plate is attached to the disk table, the aforementioned surface of the main surface section 207 of the metal plate may be attracted uniformly by a magnet fitted to the disk table with a predetermined gap.

Figure 11:
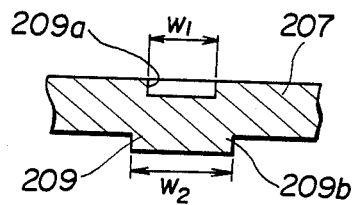
FIG. 11 is an enlarged sectional view of a protuberance provided to the metal plate shown in FIG. 7.
Figure 12:
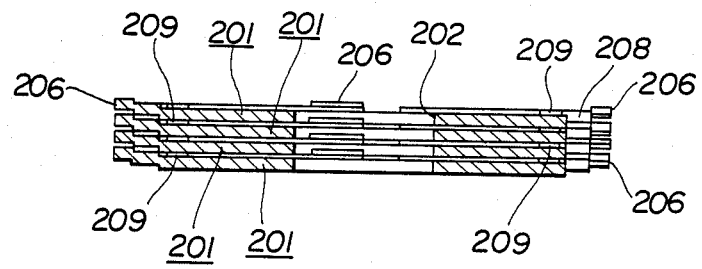
FIG. 12 is a sectional view showing a plurality metal plates shown in FIG. 7 in stacked state.

On the main surface section 207, thus machined to flatness, there are provided protuberances 209 extending from the surface of the metal plate facing the disk table magnet towards the surface facing the disk substrate, for preventing intimate contact between the disk table and the main surface section 207. A plurality of, herein three, such protuberances 209 are formed at equal distances from the center of the metal plate 201 and at equal angular intervals from one another. These protuberances 209 are formed by striking out the main surface section 207 of the metal plate 201, as shown in FIG. 11. This striking out operation is performed so that the diameter $W_2$ of a projection 209b formed on the surface confronting to the disk substrate will be larger than the diameter $W_1$ of a recess formed on the surface facing to the disk table magnet ($W_1 < W_2$).

By virtue of these protuberances 209 on the main surface section 207, a plurality of the metal plates 201 stacked one on the other are stacked with a gap between the adjoining metal plates 201 equal to the extent of the protuberance 209, so that intimate contact between the adjoining flat main surface sections 207 is avoided. In addition, since the protuberances 209 are so formed that the diameter $W_2$ of the projection 209b is larger than the diameter $W_1$ of the recess 209a, the recess 209a of the protuberance 209 of the metal plate 201 cannot be mated with the projection 209b of the adjacent metal plate 201 even when the recess 209a and the projection 209b are in register with each other, so that the intimate contact between the main surface sections 207 may be prevented positively.

Also, these protuberances 209 are projected on the surface of the metal plate 201 facing the disk substrate, when the metal plate 201 is mounted to the ring-like member secured to the disk substrate, the flatness of the surface of the metal plate facing the disk table magnet is not deteriorated so that uniform attraction by the magnet with a predetermined interval is not hindered.

Although a plurality of the protuberances 209 are provided in the above embodiment, only one such protuberance 209 may be provided on the main surface section 207.

When a plurality of these protuberances 209 are provided accurately at equal distances from the center of the metal plate 201 and at equal angular intervals from one another, they may be provided to project on the metal plate surface facing the disk table magnet, since this does not obstruct the above described uniform attraction by the magnet with a predetermined constant interval as described above.

Since it suffices that the protuberance 209 be such as will prevent intimate contact of the main surface sections 207 when the metal plates 201 are stacked one on the other, the recesses 209a need only be shaped to prevent complete mating with the projections 209b. For example, the recess 209a may be so formed as to be engaged by only a portion of the foremost part of the projection 209b.

The metal plate 201 as described above may be mounted to the ring-like member 108 mounted in turn to the disk substrate 101 shown in FIG. 3 in the correctly centered state, similarly to the first embodiment described above. The details of the ring-like member similar to those described with reference to FIG. 5 are not described for simplicity.

For mounting the metal plate 201 to the ring-like member 108, the metal plate is disposed within a metal plate housing section 118 of the ring-like member 108 so that the side of the metal plate provided with the protuberances 209 will face to the ring-like member 108. On an upright wall 119 of the metal plate housing section 118 is formed an annular recess 219. This annular recess 219 is adapted for receiving the toroidal connecting piece 204 formed on the outer periphery of the metal plate 201. It is noted that the metal plates 201 are gripped one by one with the jig engaging in the jig engaging recess 208 so as to be placed on the ring-like member 108 by the assemblying device provided with the jig.

Since the metal plates 201 are not in intimate contact when stacked one on the other, they may be gripped severally by the jig so as to be transported to and placed on the ring-like member 108.

Figure 13A:
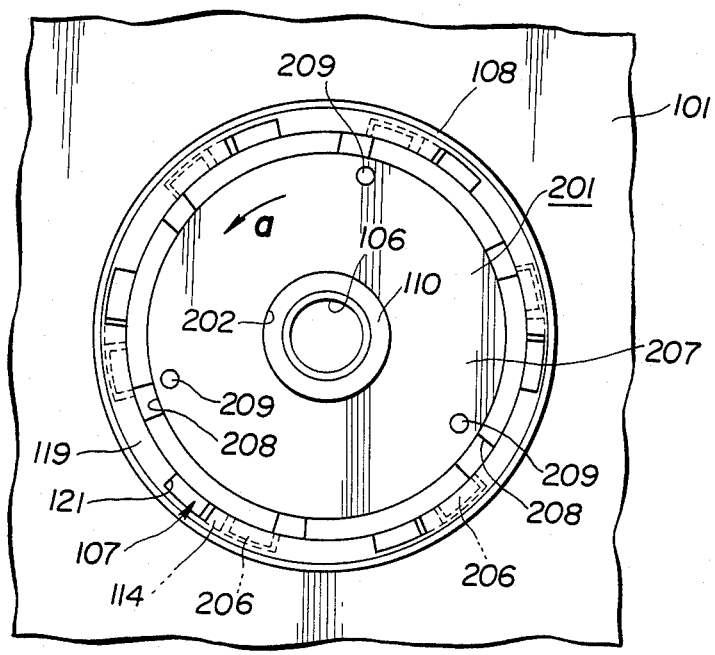
FIG. 13A is a plan view showing a disk with a hub employing a metal plate according to the second embodiment attached thereto.
Figure 13B:
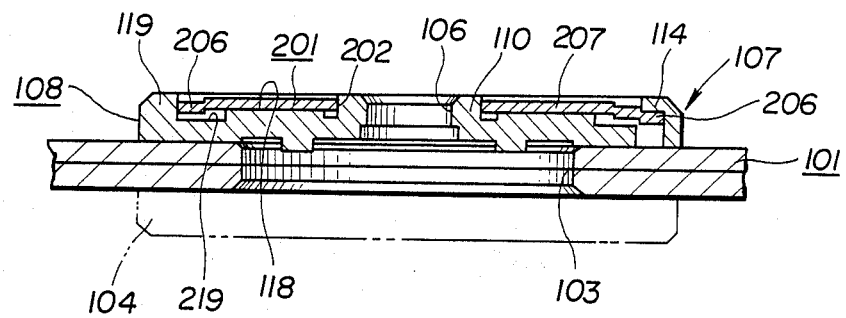
FIG. 13B is a sectional view of FIG. 13A.

When the metal plate 201 is placed in the housing section 118 of the ring-like member 108, the engaging projections 206 are inserted into the insert sections 121, the metal plate 201 is turned in a predetermined mounting direction with respect to the ring-like member 108, in this case, in the direction of an arrow mark a in FIG. 13A, so that, with the engaging projections 206 engaging as shown in FIG. 13B in the mating engaging pieces 114 formed in the mating engaging portions 107 of the ring-like member 108, the metal plate 201 is mounted in the ring-like member 108 on the disk substrate 101 to constitute the disk hub 104.

It is noted that the engaging projections 206 are each provided with a step on the outer periphery of the main surface section 207 so that when the section 207 is placed on the main surface of the ring-like member 108, the projection 206 is caused to face to the mating engagement portion 107 formed as the recess on the one main surface, and is caused to be engaged easily and positively with the mating engagement piece 114, with the chamfered portion 206a being engaged with and guided on the tapered surface 122 of the mating engagement portion 107.

In this manner, by mounting the metal plate 201 to the ring like member 108, which is in turn welded to the disk substrate 101, there is provided an optical disk having a magnetically attractive center hub 104 mounted thereon.

In the above described first and second embodiments, it may occur that the engagement between the metal plate and the ring-like member is released to release the metal plate when the rotational force is applied to the metallic plate in a direction opposite to the mounting direction to the ring-like member indicated by the arrow mark a. A third embodiment of the present invention, designed to prevent this inconvenience, will now be explained by referring to FIGS. 14 to 23.

Similar to the first embodiment described above, a disk hub 302 for clamping the optical disk to the disk drive device is mounted to the center of a disk substrate 301.

The disk substrate 301 is obtained by forming synthetic resin such as polycarbonate or glass material in the form of a disk, and is constituted by bonding two disk substrate halves each having a record layer and a protective layer for the record layer, at the respective protective layers, so as to be used as an optical disk for double side recording and/or reproduction. A center hole 303 is formed at the center of the disk substrate 301.

Figure 14:
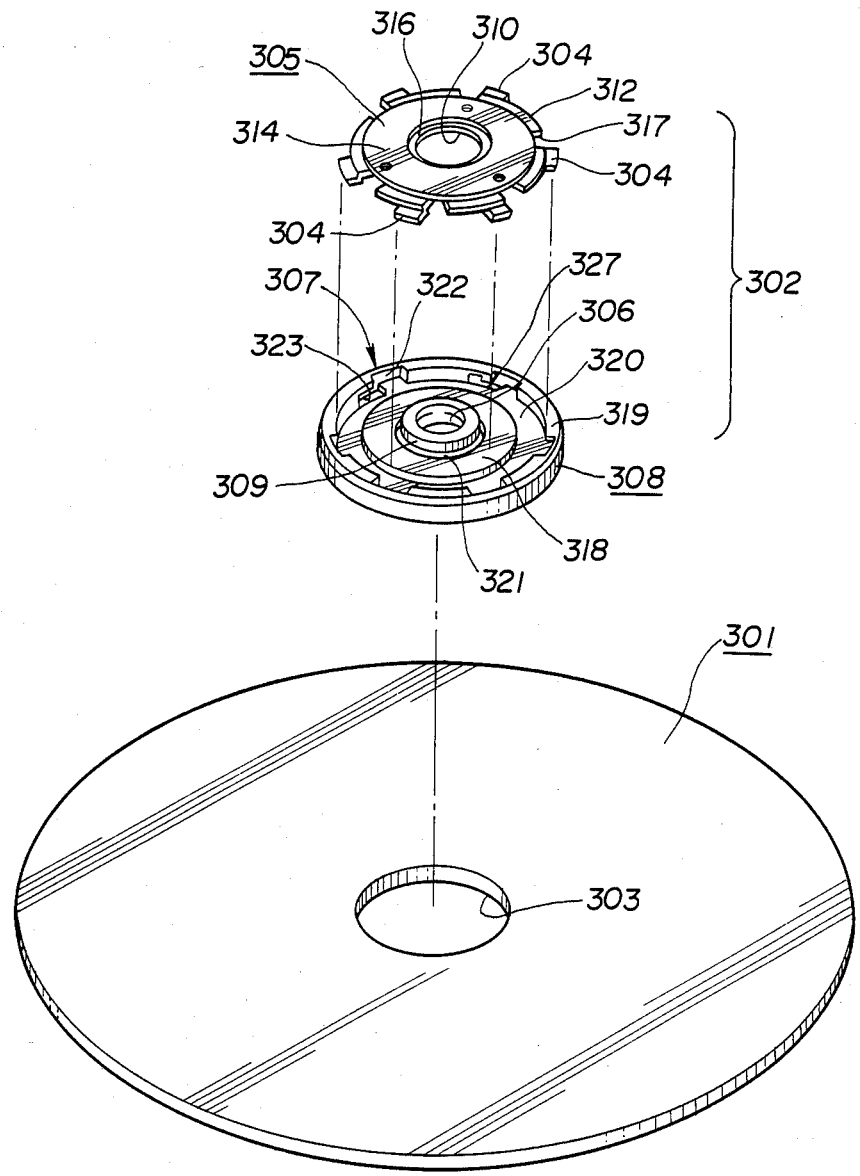
FIG. 14 is an exploded perspective view showing a disk according to a third embodiment of the present invention.
Figure 15:
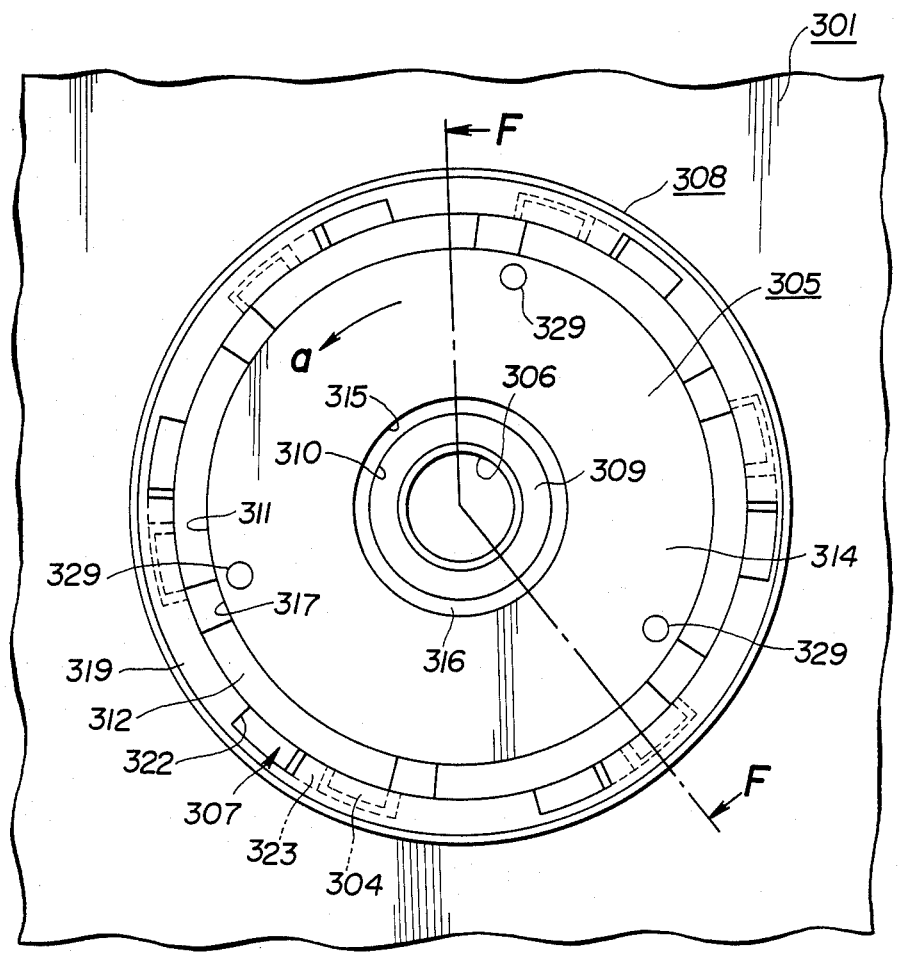
FIG. 15 is a plan view showing the mounting state of the disk hub of the disk according to a third embodiment of the present invention.

As shown in FIGS. 14 to 16, the disk hub 302 provided at the center of the disk substrate 301 is formed by a metal plate 305 having plural peripheral engaging projections 304 and a ring-like member 308 of synthetic resin which is secured onto the disk substrate 301 and which is provided with a spindle hole 306 engaged by a center spindle of the disk drive unit for rotationally driving the optical disk, and with mating engagement portions 307 engaged by engaging projections 304 of the metal plate 305.

Figure 18:
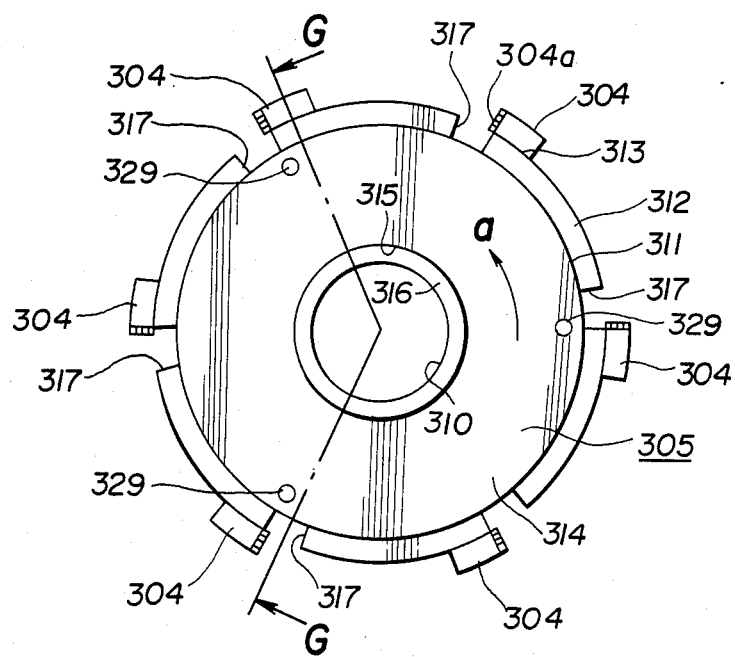
FIG. 18 is a plan view showing a metal plate according to the third embodiment.
Figure 19:
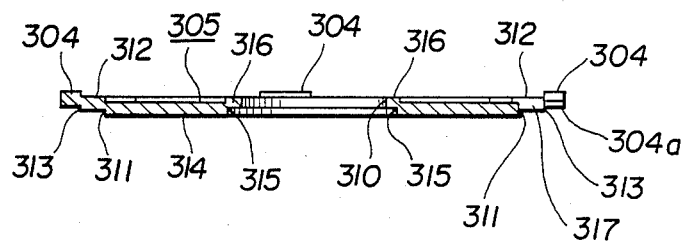
FIG. 19 is a sectional view along line G—G of FIG. 18.

The metal plate 305 is formed by punching a thin magnetic metal plate in the form of a disk and, as shown in FIGS. 18 and 19, provided with a central opening 310 engaged by a toroidal projection 309 which is formed at the center of the ring-like member 308 and provided with a spindle hole 306. On the outer periphery of the metal plate 305, a toroidal connecting piece 312 is formed by the stepping operation by the intermediary of a first step 311 formed in the semi-drawn state, as shown in FIG. 19. On the outer periphery of these toroidal connecting piece 312, plural engaging projections 304 are formed radially by the stepping operation at equal intervals through the intermediary of second steps 313 formed in the semi-drawn state. In this manner, since the engaging projections 304 are formed with the intermediary of the first and second steps 311, 313, a larger step difference may be obtained with respect to the main surface section 314 even when the metal plate 305 is formed from a thin metal plate.

Along the edge of the central hole 310, forming the inner peripheral edge of the metal plate 305, a connecting piece 316 is formed through the intermediary of a third step 315 formed in the semi-drawn state by the stepping operation in the same direction as the first step 311.

In this manner, since the larger step difference may be provided with respect to the main surface section 314 by forming the engaging projections 304 by the corresponding stepping operation of the metal plate 305, the engaging projections 304 may be formed in the metal plate 305 so as to be engaged in the mating engaging portions 307 formed on the main surface of the ring-like member 308. Also the connecting piece 316 formed on the inner peripheral edge of the metal plate 305 by the intermediary of the third step 315 may be engaged in a mating groove of the ring-like member 308, in a manner to be later described. Since no springback is caused as that occurring in the case of the bending operation, it becomes possible to adjust rigorously the dimension of the step with respect to the engaging projections 306 and the main surface section 314 of the connecting piece 316.

The toroidal connecting piece 312 of the metal plate 305 is formed with plural jig engaging recesses 317 engaged by a jig, not shown, provided in a metal plate mounting device adapted for gripping and turning the metal plate 305 when mounting the metal plate to the ring-like member 308. These recesses are formed in register with the plural engaging projections 304. These recesses 317 are formed in the direction shown by the arrow mark a in FIG. 15, that is, in the direction in which the metal plate 305 is turned during mounting the metal plate 305 to the ring-like member 308. The one lateral side of the recess is substantially contiguous to one side of the engaging projection 304. It is noted that the one side of the engaging projection 304 facing to the recess 317 is formed with a chamfered surface 304a along which the mating engaging portion 307 of the ring-like member 308 is guided for engaging with the engaging projection 304.

At least the surface of the main surface section 314 of the metal plate 305 facing to the disk table of the disk drive device is machined to a high degree of flatness, in order that when the optical disk fitted with the hub provided with the metal plate 305 is attached to the disk table, the aforementioned surface of the main surface section 314 of the metal plate may be attracted uniformly by a magnet fitted to the disk table with a predetermined gap.

It is noted that the metal plate 305 is provided with protuberances adapted for inhibiting intimate contact and formed by striking out the main surface section 314 so that the diameter of the recess formed in this manner on its surface facing to the disk table magnet will be lesser than the diameter of the projection formed on its surface facing to the disk substrate.

The ring-like member 308 is formed of the same material as the disk substrate 301, such as polycarbonate resin, for suppressing the double refraction caused by the differential heat contraction due to the difference in material from the disk substrate, and is mounted as by welding to the periphery of the central hole 303 of the disk substrate 301.

Figure 20:
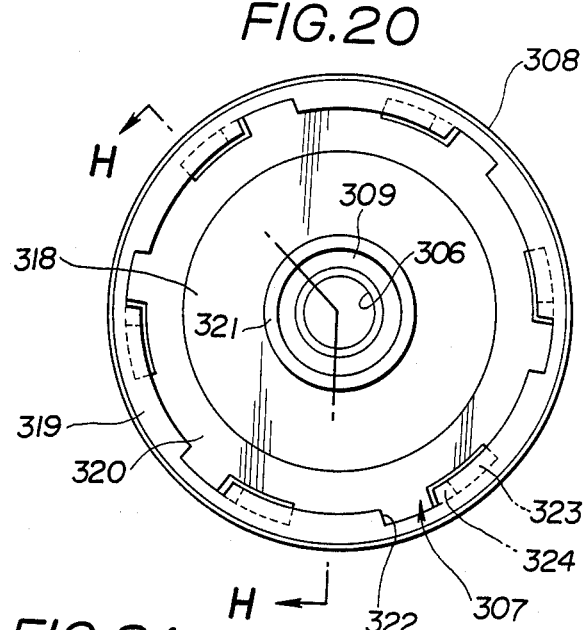
FIG. 20 is a plan view of a ring-like member according to the third embodiment.
Figure 21:
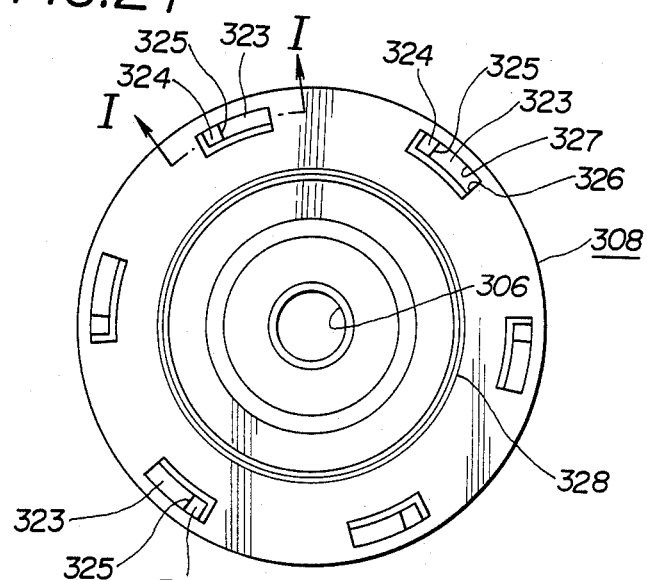
FIG. 21 is a bottom view of FIG. 20.
Figure 22:
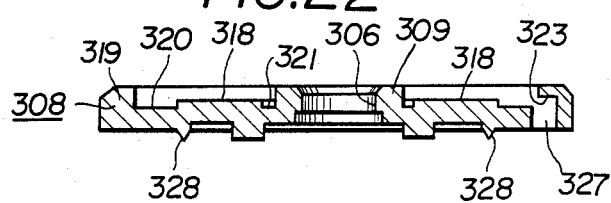
FIG. 22 is a sectional view along line H—H of FIG. 20.

As shown in FIGS. 20 to 22, the ring-like member 308 has a central spindle hole 306 engaged by a center spindle of the disk drive unit and a toroidal projection 309 on the one main surface thereof to which the metal plate 305 is mounted. On this one main surface is formed a metal plate housing section 318 surrounding the toroidal projection 309. The metal plate housing section 318 is defined as a recess extending from the outer periphery of the toroidal projection 309 on the aforementioned one main surface to the upright wall 319 formed along the outer peripheral edge of the member 308.

An annular recess 320 is formed in the housing section 318 towards the upright wall 319. The annular recess 320 is adapted for accommodating a toroidal connecting piece 312 formed on the outer periphery of the metal plate 305.

An annular groove 321 is formed on the outer periphery of a toroidal projection 309 forming the inner periphery of the housing section 318. The connecting piece 316 formed on the inner periphery of the metal plate 305 through the intermediary of a third step 315 is adapted to be engaged with and bonded to the groove 321 with an adhesive. The groove 321 has a width $W_3$ slightly larger than the width $W_4$ of the connecting piece 316, as shown in FIG. 17, so that a small gap is defined between the groove 321 and the connecting piece 316. This gap c is adapted to absorb the differential heat contraction between the metal plate 305 and the ring-like member 308 to prevent the double refraction from occurring on the disk substrate surface as a result of the differential heat contraction during the rise in temperature in the optical disk or in the recording and/or reproducing apparatus.

Figure 23:
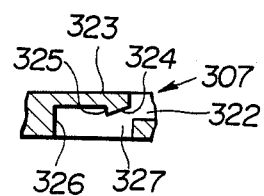
FIG. 23 is a sectional view along line I—I of FIG. 21.

On the inner periphery of the upright wall 319, mating engaging portions 307 are provided at positions in register with the engaging projections 304 formed on the outer periphery of the metal plate 305. As shown in FIGS. 20 to 23, these mating engaging portions 307 are each formed by partially cutting away a portion of the upright wall 319, and are each comprised of an insert portion 322 into which is inserted the engaging projection 304 of the metal plate 305 and a mating engaging piece 323 in which is engaged and retained the engaging projection 304 of the metal plate 305. Each mating engaging piece 323 is projectingly mounted in the associated mating engaging portion 307 in the same circumferential direction from a point adjacent to the insert portion 322. As shown in FIG. 23, the mating engaging piece 323 is provided with a retaining pawl 325 which is provided with a tapered surface 324 at the intruding end of the mating engaging piece 323 and which is adapted to inhibit rotation in the return direction of the engaging projection 304 once engaged with the mating engaging piece 323. The proximate end of the mating engaging piece 323 is provided with a control wall 326 for controlling the amount of engagement of the engaging projection 304. On the lower side of the mating engaging piece 323, there is formed a hole 327 for extracting a metal mold adapted for molding the mating engaging piece 323 of the ring-like member 308.

On the other main surface of the ring-like member 308, welding ribs 328 used for welding the ring-like member 308 to the disk substrate 301 are provided in an annular configuration. There welding ribs 328 are each in the shape of an acute-angled triangle, as shown in FIG. 22.

The above described ring-like member 308 is placed around the periphery of the central hole 303 of the disk substrate 301 with the welding ribs 328 abutting on the substrate 301, and is mounted in position with these welding ribs 328 welded to the disk substrate 301 by ultrasonic welding. At this time, the ring-like member 308 is mounted with correct centering with respect to the center of the disk substrate 301 or more correctly to the center of the track formed on the disk by the recording of the information signals or the guide track for such recording.

The metal plate 305 is mounted to the ring-like member 308, which is in turn mounted in this manner to the disk substrate 301 to constitute the disk hub 302.

For mounting the metal plate 305 to the ring-like member to constitute the disk hub 302, as is shown in FIG. 14, the metal plate 305 is placed, onto the ring-like member 308 so that the engaging projections 304 of the metal plate 305 confront the housing section 318 of the ring-like member 308. An adhesive 330 is filled in at this time in the groove 321 of the housing section 318. It is noted that, for placing the metal plate 305 in the ring-like member 308, a jig, not shown, is engaged in one of the jig engaging recesses 317 and the metal plate 305 is placed on the ring-like member 308 by the assemblying unit provided with the jig for automating the assemblying operation of the disk hub 302.

With the connecting piece 316 of the metal plate 305 engaged in the groove 321 and the engaging projections 304 inserted into the insert portions 322 of the mating engaging portions 307, the metal plate 305 is turned in the predetermined mounting direction, herein in the direction shown by an arrow mark a in FIG. 15, for engaging and retaining the engaging projections 304 in the mating engaging portions 308. Since the adhesive 322 is filled in the groove 321 of the ring-like member 308, only the connecting piece 316 forming the inner periphery of the metal plate 305 is adhered by the adhesive 322, while the main surface section 314 of the metal plate 305 is not adhered.

In this manner, the metal plate 305 is mounted to the ring-like member 308 to constitute the disk hub 302, with the engaging projections 304 on the outer periphery thereof engaging in the mating engaging portions 307 and with the connecting piece 316 on the inner periphery thereof engaging in the groove 321 and adhered therein with the adhesive 322. Thus, according to the present third embodiment, for mounting the metal plate 305 to the ring-like member 308 to constitute the disk hub 302, the metal plate 305 and the ring-like member 308 are adhered together with the adhesive 322 at the innermost peripheral portions of the metal plate 305 and the ring-like member 308 where the effect of the differential heat contraction between the metal plate 305 and the ring-like member 308 minimized, and by the engaging projections 304 engaged with the mating engaging portions 307 at the outer peripheral side, where the effect due to the differential heat contraction is maximized.

In this manner, the metal plate 305 may be reliably mounted to the ring-like member 308 while taking advantage of the engagement by the engaging projections 304, namely the prevention of double refraction caused on the surface of the disk substrate 301 due to the significant difference in the heat contraction coefficients between the metal plate 305 and the ring-like member 307 during a rise in temperature, which advantage could not be obtained by adhering the metal plate and the ring-like member together by coating the overall surface of the metal plate facing the ring-like member with an adhesive.

In addition, the groove 321 formed in the metal plate housing section 318 is slightly wider than the connecting piece ($W_3 > W_4$) to provide the gap c between the groove 321 and the connecting piece 316 to absorb the differential heat contraction between the metal plate 305 and the ring-like member 308 to prevent the double refraction liable to occur on the disk surface during a rise in temperature in the optical disk or the recording and/or reproducing apparatus.

In engaging the engaging projections 304 with the mating engaging portions 307, the engaging projections 304 formed with the step on the outer periphery of the main surface section 314 are placed in register with the mating engaging portions 307 formed by partially perforating one main surface of the ring-like member 308, with the main surface section 314 resting on the one main surface of the ring-like member 308, while the chamfered portions 304a of the engaging projections 304 are guided on and engaged with the tapered surfaces of the mating engaging pieces 323 to assure easy and positive engagement with the mating engaging piece 323.

By mounting the metal plate 305 to the ring-like member 308 in the manner described above, with the ring-like member in turn welded to the disk substrate 301, there is provided an optical disk having a magnetically attractive center hub 302 mounted thereon.

According to the present invention, the disk-like metal plate having plural peripheral engaging projections formed by the stepping operation is turned in the predetermined mounting direction with respect to the ring-like member for causing the engaging projections of the metal plate to be engaged in the mating engaging portions of the ring-like member, thereby causing the metal plate to be engaged with and retained by the ring-like member on the disk substrate, so that the mounting strength and accuracy of the metal plate in the ring like member is improved. In this manner, the metal plate in the disk hub of the optical disk facing the magnet disposed in the disk table of the disk drive unit can be positioned at all times with a predetermined gap, so that the optical disk can be mounted integrally to the disk drive unit without affecting the magnetic attraction.

What is claimed is:

1. A disk for use with a disk driving unit having a spindle shaft, the disk comprising:

a disk substrate on which a recording medium is provided;

a disk-shaped metal plate having a central aperture and a plurality of engaging projections formed on an outer periphery thereof, said engaging projections projecting radially outwardly from said periphery and constituting radially outermost portions of said disk-shaped metal plate; and a ring-like member of synthetic resin material secured at a predetermined position on said disk substrate and having a central aperture for accommodating the spindle shaft of the disk driving unit, said ring-like member also having a corresponding plurality of mating engaging portions for receiving said plurality of engaging projections, each of said mating engaging portions having a control part for controlling an amount of rotation of said metal plate in a predetermined mounting direction relative to said ring-like member and an inhibit part for inhibiting rotation of said metal plate in a direction opposite said predetermined mounting direction, so that upon said metal plate being rotated in said predetermined mounting direction, said engaging projections of said metal plate engage said mating engaging portions of said ring-like member for mounting said metal plate onto said ring-like member.

2. A disk according to claim 1 wherein said plurality of engaging projections each include a first step and a second step formed on an outer peripheral side of said first step.

3. A disk according to claim 2 wherein said engaging projections are formed at equal circumferential intervals on said metal plate.

4. A disk according to claim 3 wherein each of said engaging projections have a chamfered surface by which each said engaging projection is guided into engagement with said mating engaging portion of said ring-like member.

5. A disk according to claim 1 wherein said engaging projections of said metal plate each have a tapered surface at a forward end relative to said predetermined mounting direction for guiding said engaging projections into engagement with said mating engaging portions of said ring-like member.

6. A disk according to claim 1 wherein said synthetic resin material has substantially the same heat contraction coefficient as said disk substrate.

7. A disk according to claim 6 wherein said ring-like member is formed of the same synthetic resin material as said disk substrate.

8. A disk according to claim 1 wherein said metal plate has at least one jig engaging portion formed on said outer periphery thereof and adapted to be engaged by a jig of a metal plate mounting device.

9. A disk according to claim 8 wherein said jig engaging portion is provided in register with said engaging projections of said metal plate.

10. A disk according to claim 9 wherein said jig engaging portion is a recess.

11. A disk according to claim 1 wherein a main surface section of said metal plate has means for inhibiting intimate contact between adjacent ones of a plurality of said metal plates stacked together.

12. A disk according to claim 11 wherein said inhibit means is a protuberance.

13. A disk for use with a disk driving unit having a spindle shaft, the disk comprising:
a disk substrate on which a recording medium is provided;
a disk-shaped metal plate having a central aperture and a plurality of engaging projections formed on an outer periphery thereof; and
a ring-like member of synthetic resin material secured at a predetermined position on said disk substrate and having a central aperture for accommodating the spindle shaft of the disk driving unit, said ring-like member also having a corresponding plurality of mating engaging portions for receiving said plurality of engaging projections, each of said mating engaging portions having a control part for controlling an amount of rotation of said metal plate in a predetermined mounting direction relative to said ring-like member and an inhibit part for inhibiting rotation of said metal plate in a direction opposite said predetermined mounting direction, so that upon said metal plate being rotated in said predetermined mounting direction, said engaging projections of said metal plate engage said mating engaging portions of said ring-like member for mounting said metal plate onto said ring-like member;
wherein said plurality of engaging projections each include a first step and a second step formed on an outer peripheral side of said first step; and
wherein said ring-like member is provided with a first recess for housing said metal plate, said ring-like member including an upright wall forming an outer peripheral edge thereof, and a plurality of second recesses formed on said upright wall, each adapted for accommodating said first step of said plurality of engaging projections, respectively.

14. A disk according to claim 13 wherein said ring-like member is shaped as a disk and said first recess of said ring-like member is defined on a flat surface of said disk between an outer peripheral side of said peripheral wall of said central aperture and said upright wall.

15. A disk according to claim 14 wherein a mold extraction opening is provided adjacent a lower surface of each of said mating engaging portions of said ring-like member for forming said mating engaging portions during casting of said synthetic resin material forming said ring-like member.

16. A disk according to claim 14 wherein said metal plate has a third step formed on an inner periphery thereof and extending in a same direction as said first step of said metal plate, and wherein an annular groove is formed on an inner peripheral side of said first recess of said ring-like member and on said outer peripheral side of said peripheral wall of said central aperture of said ring-like member for engaging said third step.

17. A disk according to claim 16 wherein a depth of said annular groove is greater than said extension of said third step of said metal plate such that a gap is provided between said third step and said annular groove for absorbing differential heat contraction between said metal plate and said ring-like member.

18. A disk according to claim 17 wherein said groove of said ring-like member has a width larger than a corresponding width of said third step of said metal plate.

19. A disk according to claim 18 further comprising an adhesive, whereby said third step of said metal plate and said groove of said ring-like member are mutually adhered by said adhesive.

20. A disk for use with a disk drive unit having a spindle shaft, the disk comprising:
a disk substrate on which a recording medium is provided;
a disk-shaped metal plate having a central aperture and a plurality of engaging projections formed on an outer peripheral thereof; and
a ring-like member of synthetic resin material secured at a predetermined position on said disk substrate and having a central aperture for accommodating the spindle shaft of the disk drive unit, said ring-like member also having a corresponding plurality of mating engaging portions for receiving said plurality of engaging projections, each of said mating engaging portions having a control part for controlling an amount of rotation of said metal plate in a predetermined mounting direction relative to said ring-like member and an inhibit part for inhibiting rotation of said metal plate in a direction opposite said predetermined mounting direction, so that upon said metal plate being rotated in said predetermined mounting direction, said engaging projections of said metal plate engage said mating engaging portions of said ring-like member for mounting said metal plate onto said ring-like member;
wherein a main surface section of said metal plate has means for inhibiting intimate contact between adjacent ones of a plurality of said metal plates stacked together;
wherein said inhibit means is a protuberance; and
wherein said protuberance is formed by a recess on a side of said metal plate facing a disk table of said disk driving unit and a projection on another side of said metal plate facing said disk substrate, said projection being wider than said recess.

21. A disk comprising:
a disk substrate on which a recording medium is provided;
a disk-like metal plate having a first stepped portion formed on the outer periphery of said metal plate, a second stepped portion formed on the outer side of said first stepped portion, and a plurality of engaging projections formed at equal circumferential intervals extending outwardly from said second stepped portion; and
a ring-like member of synthetic resin material having substantially the same heat contraction coefficient as said disk substrate, said ring-like member being formed with an upright wall on its outer periphery defining a housing for said metal plate and being formed adjacent to said outer wall with a recess for accommodating said first stepped portion, said ring-like member being secured at a predetermined position of said disk substrate and having a center hole and mating engaging portions each including a control part for controlling the amount of rotation of said metal plate in a predetermined mounting direction and an inhibit part for inhibiting the rotation of said metal plate in a direction opposite to said mounting direction;

said metal plate being turned in said mounting direction with respect to said ring-like member in order to engage said projections with said engaging portions and thereby mount said metal plate.

* * * * *